United States Patent [19]

Hesse

[11] Patent Number: 5,434,851
[45] Date of Patent: Jul. 18, 1995

[54] DIGITAL TELECOMMUNICATIONS SWITCHING SYSTEM

[75] Inventor: Dieter Hesse, Munich, Germany

[73] Assignee: Siemens Aktiengesellschaft, Munich, Germany

[21] Appl. No.: 258,596

[22] Filed: Jun. 10, 1994

Related U.S. Application Data

[63] Continuation of Ser. No. 935,203, Aug. 26, 1992, abandoned.

[30] Foreign Application Priority Data

Sep. 20, 1991 [EP] European Pat. Off. ........ 91116051.3

[51] Int. Cl.[6] .......................................... H04Q 11/04
[52] U.S. Cl. .................................. 370/58.2; 370/58.3; 379/268; 379/269
[58] Field of Search .................. 370/58.2, 58.3, 60, 370/94.1; 379/269, 268

[56] References Cited

U.S. PATENT DOCUMENTS

| | | | |
|---|---|---|---|
| 4,736,409 | 4/1988 | Hasegawa et al. | 379/269 |
| 4,807,281 | 2/1989 | Weber et al. | 379/269 |
| 4,896,319 | 1/1990 | Lidinsky et al. | 370/60 |
| 4,949,338 | 8/1990 | Albal et al. | 370/85.6 |

OTHER PUBLICATIONS

"ITT 1240 Digital Exchange Hardware Description", S. Das et al, Electrical Communication, Jan. 1, 1982, pp. 135–147.
"ITT 1240 Digital Exchange Architecture", R. Bonami et al, pp. 126–134.
"An ATM Switching Unit Architecture for BISDN", J. P. Glon et al, Proceedings of the International Switching Symposium, May 27–Jun. 1, 1990, pp. 7–14.
"Two Years of Experience with Broadband ISDN Field Trial", by G. Domann, Proceedings of the International Switching Symposium, May 27–Jun. 1, 1990, pp. 87–92.
"Application of Distributed Control to Handling Non--Voice Services", vol. 56, No. 1, (1981), pp. 45–56.

Primary Examiner—Douglas W. Olms
Assistant Examiner—Russell W. Blum
Attorney, Agent, or Firm—Hill, Steadman & Simpson

[57] ABSTRACT

Digital telecommunications switching system. A plurality of identical switching controllers (ASC) are connected to one another via a switching network (ICN) that sets up line connections and, as in the case of a super-massive parallel computer, that operates simultaneously on the execution of small sub-operations relating to the same connection. A portion of the control units have special processors (DSB, CTP, I/F) allocated to them. The switching network has a call throughput rate that is greater than the requirement of the actual set up of line connections.

19 Claims, 3 Drawing Sheets

5,434,851

DIGITAL TELECOMMUNICATIONS SWITCHING SYSTEM

This is a continuation, of application Ser. No. 935,203, filed Aug. 26, 1992, abandoned.

BACKGROUND OF THE INVENTION

The present invention is directed to a digital telecommunications switching system for switching voice, video and data signals.

The development of future telecommunications switching systems is in the direction of an integration of the telecommunication services of voice, video and data communication. This requires a universal network node having a uniform switching network for the through-connection of narrowband and broadband information. Such a universal network node used as a cross connection must provide through-connection speeds from 10 Gb/s for narrowband connections up to 600 Gb/s for broadband connections.

What are referred to as massive parallel computers are coming to the forefront in computer architecture that satisfies greater performance demands, such as simulation calculations. In such computers, a great plurality of processors (for example, 10,000 through 20,000), which in themselves are not especially fast, operate in parallel on the solution of a problem. The processors thereby communicate with one another via connecting networks having high call-handling capacity for which standard modules will be available in the future.

SUMMARY OF THE INVENTION

It is an object of the present invention to provide an architecture for a telecommunications switching system which allows a uniform handling of voice, image and data information and for which the anticipated technology advances in the field of high-performance parallel computers are specifically utilized.

This object is inventively achieved by a plurality of identical switching controllers, each having a local memory which can be connected to one another via a switching network for setting up line connections. The call throughput rate of this switching network lies so far above the demands, in regards to actual set up of line connections, that a great majority of the switching controllers are utilized for a partially parallel execution of small sub-operations relating both to the line circuit area, as well as, to the central area of the exchange that are related to one and the same connection. Some of these switching controllers have processors for handling special operations related to the associated connection which proceed beyond the sub-operations in terms of their allocated complexity. As a result of the concept of the present invention, a universal exchange results by means of which information, that is transmitted both in synchronous transfer mode (STM) as well as in asynchronous transfer mode (ATM), is switched without requiring a uniform external format. Given ATM cells as such a format, this could lead to problems relating to running time or echoes because of the multiple packeting and depacketing of the STM information required under certain circumstances in this case. On the contrary, the internal cell format of the switching network has a variable length, so that, beginning with an octet, i.e. the channel time span of narrowband surfaces, it can accept up to and beyond the length of ATM cells.

Since the great majority of the processors employed are uniform, a hardware structure having a relatively low multiplicity of types results.

In a further development of the present invention, the switching network forms a central unit and cooperates with identical, preferably spatially remote units via which connections to subscriber lines are set up.

In another development of the present invention, the switching network is divided into sub-units that we separated in view of the setup of connections to subscriber lines, to trunk lines, and to administration and maintenance equipment, these sub-units being connected to one another by transmission equipment.

As a result of these developments, geographical flexibility is provided in one case and connection flexibility in another case.

Further developments are directed to the differing supplementation of the great plurality of processors by different special processors in different combinations. On this basis the system is flexible with regards to conditions created by the type of traffic and the traffic load to be anticipated.

It is advantageous in terms of installation in all of these developments that uniform interfaces are provided between the switching network and the exchange units, as well as, between the latter and the special processors allocated to them.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
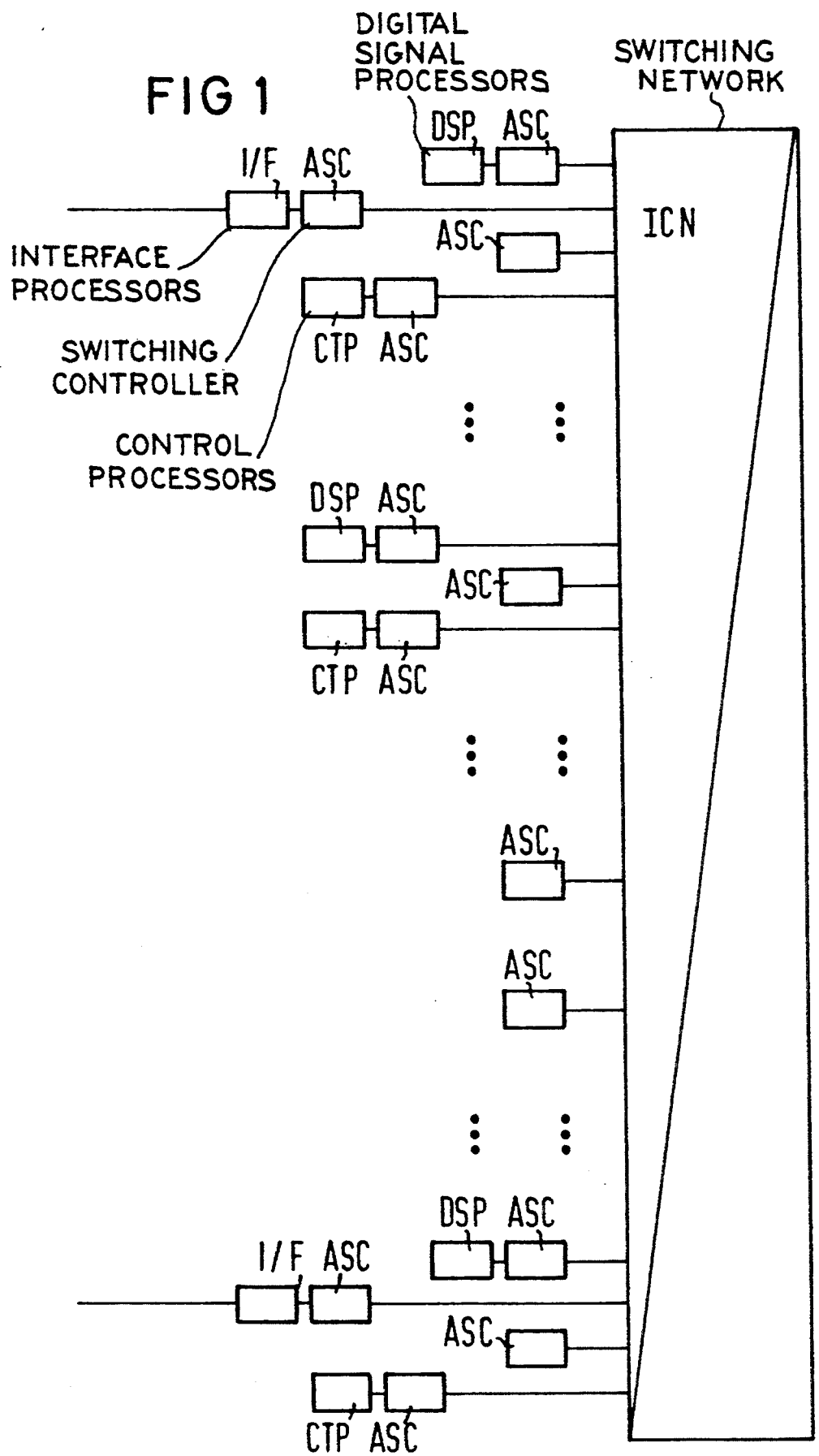
FIG. 1 is a block diagram depicting the structure of a telecommunications switching system of the present invention.

The telecommunications system of the present invention according to FIG. 1 is essentially composed of a switching network ICN and of a plurality of switching controllers ASC connected thereto that are identical to one another. Special processors, namely digital signal processors DSP, control processors CTP and interface processors I/F, are allocated to a smaller part of the switching controllers ASC.

The connection of subscriber lines, of multiplex lines connecting to subscriber concentrators and of trunk lines to other exchanges occurs via the interface processors I/F.

Given this structure of an exchange, the switching network ICN no longer mainly serves the purpose of setting up line connections, but serves the purpose to a considerable extent of allowing the connected switching controllers to communicate with one another.

Figure 2:
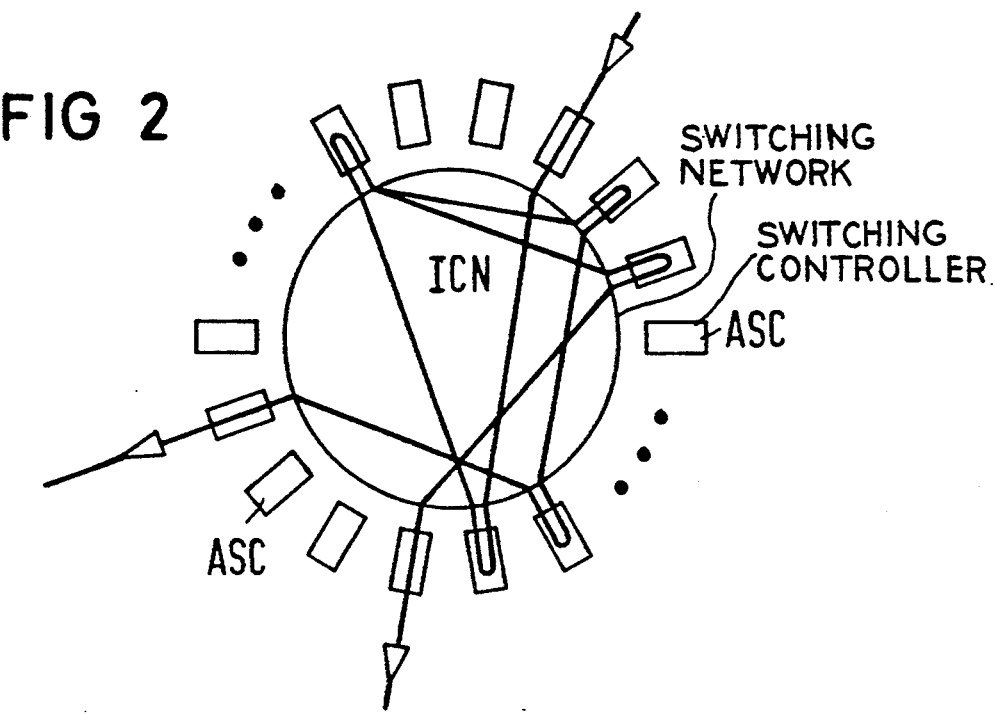
FIG. 2 is a symbolic illustration of such a system for illustrating the collaboration between the processors.

The operations to be implemented in conjunction with switching and with the operation of an exchange are divided into a great plurality of sub-operations which (as related to a single connection) are executed by a great plurality of the switching controllers either in independent operation or in collaboration in common with the respectively allocated special processors and, partly, sequencing in parallel. Information to be switched, for example STM information or ATM information, can multiply traverse the switching network ICN before the information proceeds onto an outgoing line, as symbolically illustrated in FIG. 2.

The switching controllers ASC have a local memory and are designed such that they can assume a number of other functions in addition to the actual through-connection of connecting paths.

The switching controllers ASC can assume the required operations in conjunction with special services such as broadcasting, A-/law/u.law-conversion, attenuation and interworking. They can assume the packeting and depacketing in conjunction with handling ATM information and their job can be the insertion and extraction of the cell header (SOH) when handling information for a synchronous optical Network (SONET).

As already mentioned, they realize the various interfaces together with an interface processor I/F.

A collaboration of a switching controller ASC and a control processor CTP comes into consideration for handling a SONET cell header (SOH handling).

The handling of the operations in conjunction with echo suppression and compression and decompression of information resulting from or intended for a mobile radio telephone service network could be the job of a digital signal processor DSP. In this case, the switching controller to which such a signal processor is allocated would then only have the job of delivering and forwarding the information.

The aforementioned control processors CTP, are utilized for control functions in conjunction with switching control, error treatment and administration and maintenance jobs. Also in this case, the switching controllers ASC to which the control processors are allocated merely have the job of transferring information or forwarding information.

The interfaces between the switching network ICN and the switching controllers ASC, as well as, between the switching controllers ASC and the allocated processors DSP, CTP or I/F for executing special operations are thereby uniform. A liberal arrangement is thus possible and, moreover, an individual wiring, particularly that of a wiring backplane can thereby be partly eliminated.

Figure 3:
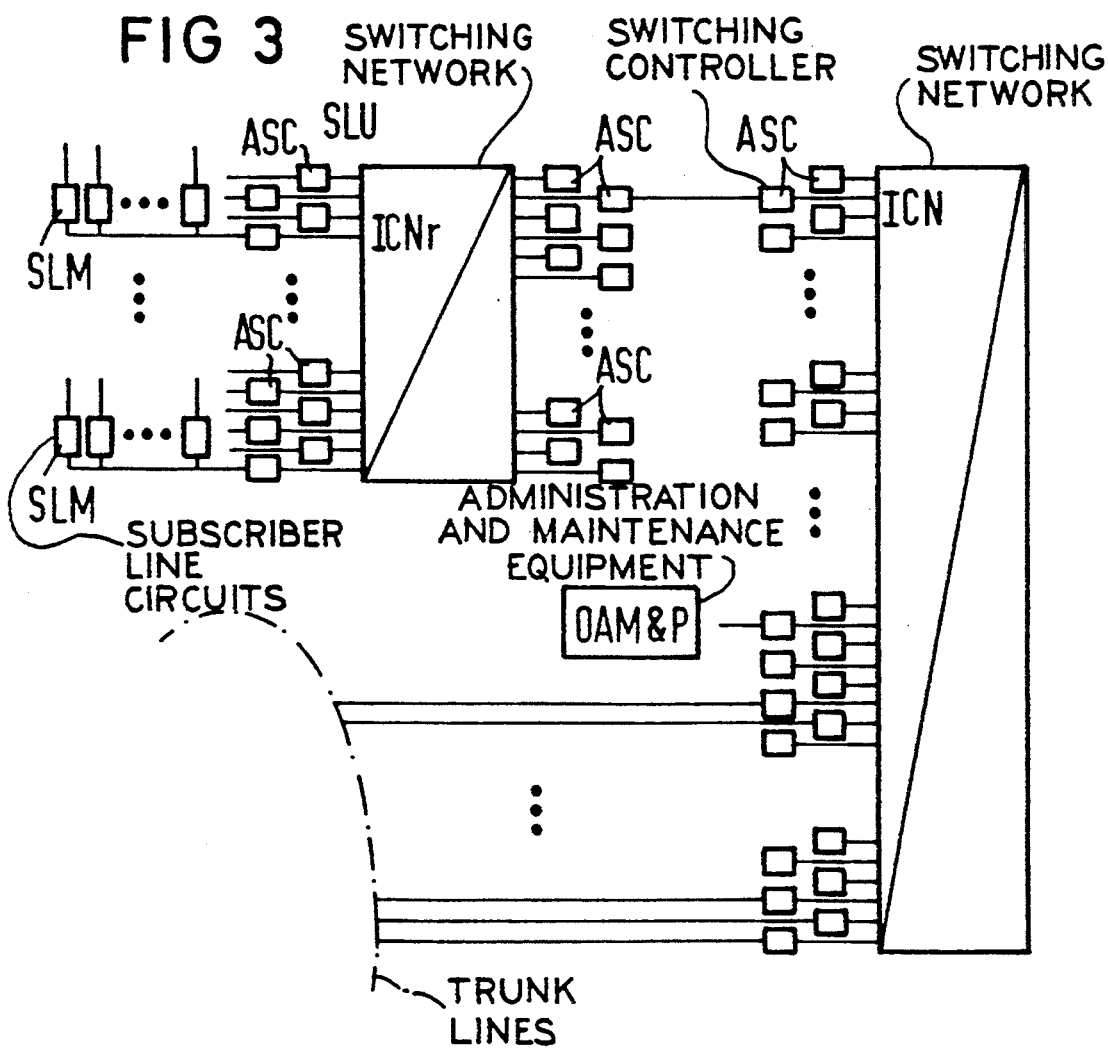
FIGS. 3 and 4 are block diagrams depicting structural modifications of the telecommunications switching system of the present invention.

As shown in FIG. 3, the switching network of FIG. 1 with connected switching controllers and special processors can be supplemented by an identical switching network ICNr of a spatially remote unit SLU which, however, is only connected to external subscriber lines via subscriber line circuits SLM. The range of functions of operations to be executed in conjunction with terminal equipment connected to the subscriber lines can thereby be liberally distributed over the remote unit and the central part of the exchange.

Figure 4:
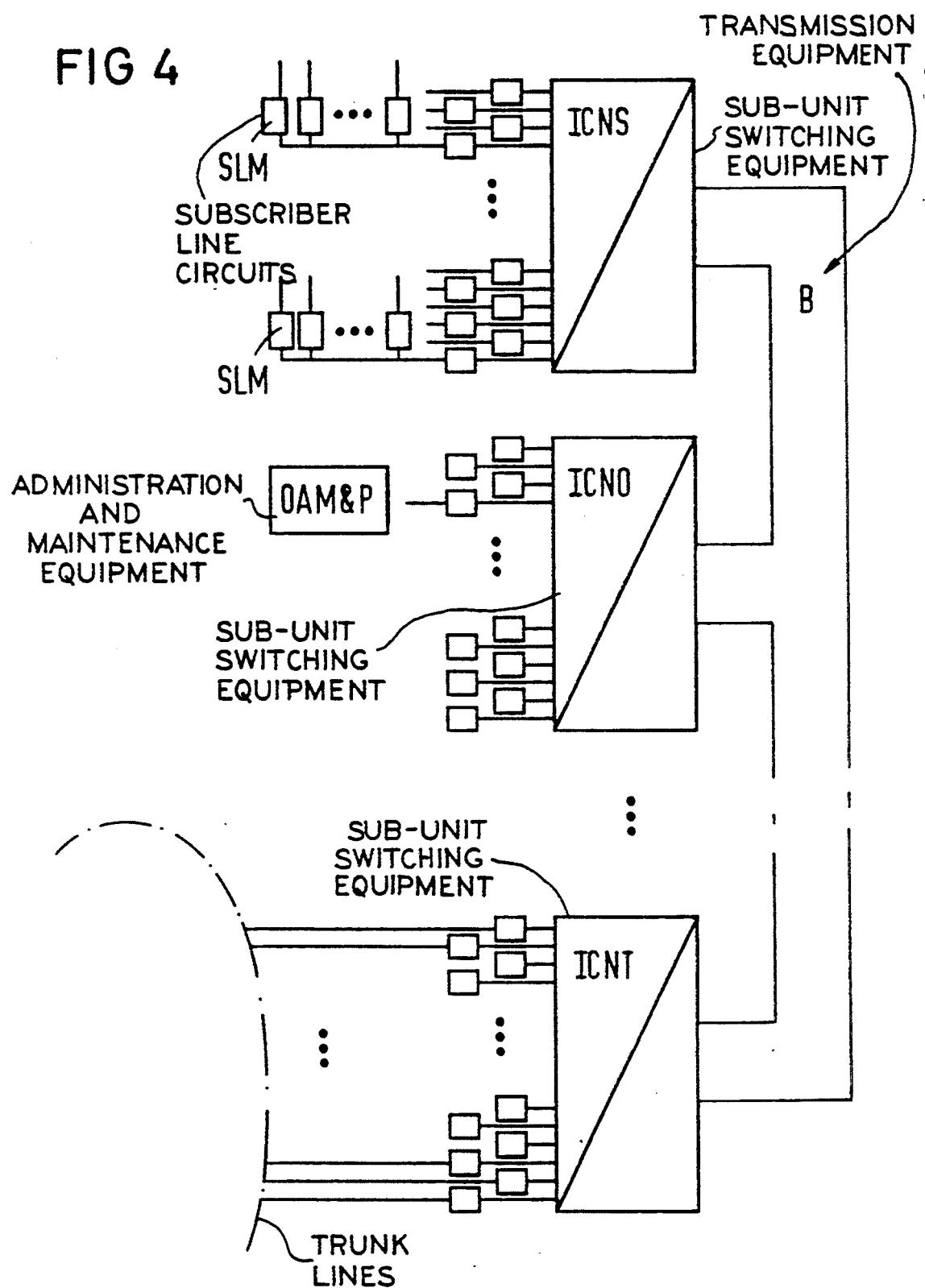

FIG. 4 shows another way of functionally organizing the digital switching system of the present invention. Here the switching network ICN is subdivided into three types of sub-units, i.e. sub-units ICNS that serve the purpose of connecting subscriber lines, sub-units ICNT that serve the purpose of connecting trunk lines, and sub-units ICNO that serve the purpose of connecting administration and maintenance equipment OAM and P. The three types of sub-units are in communication with one another via transmission equipment B.

Mixed forms of the structures depicted in FIG. 3 and FIG. 4 are feasible and are encompassed by the present invention.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A digital telecommunications switching system for switching voice, video and data signals, comprising: a plurality of identical switching controllers each of which has a local memory, the switching controllers being connectable to one another via a switching network that has a function of setting up line connections, the switching network having a call throughput rate greater than a call throughput rate required for the actual set up of line connections such that a majority of the switching controllers are available for partial parallel executing of small sub-operations relating both to a line circuit area and a central exchange area which are related to a common connection; and a portion of said majority of the switching controllers having respective processors allocated thereto for executing special operations relating to the appertaining connection whose complexity or specialization extends beyond a complexity or specialization of the sub-operations.

2. The telecommunications switching system according to claim 1, wherein uniform interfaces are provided between the switching network and the switching controllers, and wherein further uniform interfaces are provided between the switching controllers and the respective processors allocated thereto for the execution of special operations.

3. The telecommunications switching system according to claim 1, wherein the switching network forms a central unit and cooperates with identical, spatially remote units via which connections are set up to subscriber lines.

4. The telecommunications switching system according to claim 1, wherein the switching network is divided into separate sub-units for respectively setting up connections to subscriber lines, to trunk lines and to administration and maintenance equipment, said sub-units being connected to one another by transmission equipment.

5. The telecommunications switching system according to claim 1, wherein the processors for executing special operations are signal processors.

6. The telecommunications switching system according to claim 1, wherein the processors for executing special operations are control processors.

7. The telecommunications switching system according to claim 1, wherein processors for executing special operations comprise control processors and digital signal processors.

8. The telecommunications switching system according to claim 1, wherein the processors for executing special operations comprise control processors, digital signal processors and interface processors.

9. A digital telecommunications switching system for switching voice, video and data signals on at least one of subscriber lines, trunk lines and administration and maintenance lines, comprising: a switching network and a plurality of substantially identical switching controllers that are connectable to one another via the switching network that has a function of setting up line connections, the switching network having a call throughput rate greater than a call throughput rate required for actual set up of line connections such that some of the switching controllers are available for partial parallel execution of small sub-operations relating both to a line circuit area and a central exchange area which are related to a common connection; and a portion of said some of the switching controllers having respective processors allocated thereto for executing special operations.

10. The telecommunications switching system according to claim 9, wherein the switching network forms a central unit and wherein the system further comprises identical, spatially remote units via which in cooperation with the switching controller connections are set up to the subscriber lines.

11. The telecommunications switching system according to claim 9, wherein the switching network is divided into separate sub-units for respectively setting up connections to the subscriber lines, to the trunk lines and to the administration and maintenance equipment, said sub-units being connected to one another by transmission equipment.

12. The telecommunications switching system according to claim 9, wherein the processors for executing special operations are signal processors.

13. The telecommunications switching system according to claim 9, wherein the processors for executing special operations are control processors.

14. The telecommunications switching system according to claim 9, wherein the processors for executing special operations comprise control processors and digital signal processors.

15. The telecommunications switching system according to claim 9, wherein the processors for executing special operations comprise control processors, digital signal processors and interface processors.

16. A digital telecommunications switching system for switching voice, video and data signals on subscriber lines, trunk lines and administration and maintenance lines, comprising: a switching network and a plurality of identical switching controllers that are directly connectable to one another via the switching network that has a function of setting up line connections, the switching network having a call throughput rate greater than a call throughput rate required for actual set up of line connections; some of the switching controllers useable in parallel execution of sub-operations relating both to a line circuit area and a central exchange area which are related to a common connection; and a portion of said some of the switching controllers having respective processors connected thereto for executing special operations, the processors being composed of control processors, digital signal processors and interface processors, said switching network establishing communication between switching controllers of said some of said switching controllers as a function of a line connection.

17. The telecommunications switching system according to claim 16, wherein the system further comprises: uniform means for interfacing the switching network to the switching controllers, and further uniform means for interfacing the switching controllers to the respective processors.

18. The telecommunications switching system according to claim 16, wherein the switching network forms a central unit and wherein the system further comprises identical, partially remote units via which in cooperation with the switching controller connections are set up to the subscriber lines.

19. The telecommunications switching system according to claim 16, wherein the switching network is divided into separate sub-units for respectively setting up connections to the subscriber lines, to the trunk lines and to the administration and maintenance equipment, said sub-units being connected to one another by transmission equipment.

* * * * *